United States Patent
Xiao et al.

(10) Patent No.: US 10,115,419 B2
(45) Date of Patent: Oct. 30, 2018

(54) METHOD FOR AFC SHIELDS FOR MULTIPLE SENSOR MAGNETIC TRANSDUCERS AND MAGNETIC TRANSDUCERS HAVING MULTIPLE SENSORS AND AFC SHIELDS

(71) Applicant: WESTERN DIGITAL (FREMONT), LLC, Fremont, CA (US)

(72) Inventors: Rongfu Xiao, Dublin, CA (US); Shihai He, Fremont, CA (US); Daniele Mauri, San Jose, CA (US); Ming Mao, Dublin, CA (US); Shaoping Li, San Ramon, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/672,857

(22) Filed: Aug. 9, 2017

(65) Prior Publication Data

US 2017/0337941 A1  Nov. 23, 2017

Related U.S. Application Data

(62) Division of application No. 15/219,474, filed on Jul. 26, 2016, now Pat. No. 9,754,613, which is a division
(Continued)

(51) Int. Cl.
*G11B 5/39* (2006.01)
*G11B 5/11* (2006.01)
(Continued)

(52) U.S. Cl.
CPC ............ *G11B 5/3912* (2013.01); *C21D 6/001* (2013.01); *C21D 6/007* (2013.01); *C21D 9/0068* (2013.01);
(Continued)

(58) Field of Classification Search
None
See application file for complete search history.

(56) References Cited

U.S. PATENT DOCUMENTS 6,016,290 A   1/2000  Chen et al.
6,018,441 A   1/2000  Wu et al.
(Continued)

OTHER PUBLICATIONS

Non-Final Office Action on U.S. Appl. No. 15/219,474 dated Mar. 9, 2017.

*Primary Examiner* — William J Klimowicz
(74) *Attorney, Agent, or Firm* — Foley & Lardner LLP

(57) ABSTRACT

A method and system provide a magnetic transducer having an air-bearing surface (ABS). The method includes providing a first shield, a first read sensor, an antiferromagnetically coupled (AFC) shield that includes an antiferromagnet, a second read sensor and a second shield. The read sensors are between the first and second shields. The AFC shield is between the read sensors. An optional anneal for the first shield is in a magnetic field at a first angle from the ABS. Anneals for the first and second read sensors are in magnetic fields in desired first and second read sensor bias directions. The AFC shield anneal is in a magnetic field at a third angle from the ABS. The second shield anneal is in a magnetic field at a fifth angle from the ABS. The fifth angle is selected based on a thickness and a desired AFC shield bias direction for the antiferromagnet.

18 Claims, 10 Drawing Sheets

Related U.S. Application Data of application No. 14/667,433, filed on Mar. 24, 2015, now Pat. No. 9,431,031.

(51) Int. Cl.
*G11B 5/48* (2006.01)
*C21D 6/00* (2006.01)
*C21D 9/00* (2006.01)
*G11B 5/31* (2006.01)

(52) U.S. Cl.
CPC ............... *G11B 5/11* (2013.01); *G11B 5/112* (2013.01); *G11B 5/3163* (2013.01); *G11B 5/397* (2013.01); *G11B 5/3932* (2013.01); *G11B 5/3948* (2013.01); *G11B 5/4886* (2013.01); *G11B 5/3909* (2013.01); *G11B 2005/3996* (2013.01)

(56) References Cited

U.S. PATENT DOCUMENTS

| | | | |
|---|---|---|---|
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,055,138 A | 4/2000 | Shi |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,160,684 A | 12/2000 | Heist et al. |
| 6,163,426 A | 12/2000 | Nepela et al. |
| 6,166,891 A | 12/2000 | Lederman et al. |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,411,522 B1 | 6/2002 | Frank et al. |
| 6,417,998 B1 | 7/2002 | Crue et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 7,371,152 B1 | 5/2008 | Newman |
| 7,372,665 B1 | 5/2008 | Stoev et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,065,788 B2 | 11/2011 | Guruz et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,307,539 B1 | 11/2012 | Rudy et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,400,731 B1 | 3/2013 | Li et al. |
| 8,491,801 B1 | 7/2013 | Tanner et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,533,937 B1 | 9/2013 | Wang et al. |
| 8,593,914 B2 | 11/2013 | Wang et al. |
| 8,597,528 B1 | 12/2013 | Roy et al. |
| 8,599,657 B1 | 12/2013 | Lee |

(56) References Cited

U.S. PATENT DOCUMENTS

| | | |
|---|---|---|
| 8,603,593 B1 | 12/2013 | Roy et al. |
| 8,611,054 B1 | 12/2013 | Shang et al. |
| 8,611,055 B1 | 12/2013 | Pakala et al. |
| 8,630,068 B1 | 1/2014 | Mauri et al. |
| 8,634,280 B1 | 1/2014 | Wang et al. |
| 8,643,980 B1 | 2/2014 | Fowler et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,818 B1 | 6/2014 | Diao et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,873,204 B1* | 10/2014 | Gao ............ G11B 5/3977 360/319 |
| 9,042,059 B1* | 5/2015 | Katine ........ G11B 5/3909 360/316 |
| 9,099,125 B1* | 8/2015 | Hattori ....... G11B 5/3912 |
| 9,147,409 B1 | 9/2015 | Nikolaev et al. |
| 9,431,031 B1* | 8/2016 | Xiao ............ G11B 5/11 |
| 9,536,549 B1 | 1/2017 | Ge et al. |
| 9,754,613 B2* | 9/2017 | Xiao ............ G11B 5/11 |
| 9,786,301 B1* | 10/2017 | Li ............... G11B 5/11 |
| 9,786,305 B1* | 10/2017 | Li ............... G11B 5/3948 |
| 9,870,791 B1* | 1/2018 | Sapozhnikov ....... G11B 5/3958 |
| 2009/0251829 A1* | 10/2009 | Zhang ............ B82Y 10/00 360/319 |
| 2009/0279213 A1* | 11/2009 | Wu ............... G11B 5/3163 360/319 |
| 2010/0290157 A1 | 11/2010 | Zhang et al. |
| 2011/0086240 A1 | 4/2011 | Xiang et al. |
| 2012/0002330 A1* | 1/2012 | Matsuzawa ....... B82Y 10/00 360/313 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0002962 A1 | 1/2015 | Singleton et al. |
| 2015/0140685 A1* | 5/2015 | Watanabe ........ H01L 21/312 438/3 |
| 2016/0005424 A1* | 1/2016 | McKinlay ....... G11B 5/115 360/121 |
| 2016/0365104 A1* | 12/2016 | Ge ............... G11B 5/3912 |
| 2017/0011759 A1* | 1/2017 | Ge ............... G11B 5/3932 |
| 2017/0294199 A1* | 10/2017 | Ge ............... G11B 5/3974 |

\* cited by examiner

METHOD FOR AFC SHIELDS FOR MULTIPLE SENSOR MAGNETIC TRANSDUCERS AND MAGNETIC TRANSDUCERS HAVING MULTIPLE SENSORS AND AFC SHIELDS

CROSS-REFERENCE TO RELATED PATENT APPLICATIONS

This application is a divisional of U.S. application Ser. No. 15/219,474, filed on Jul. 26, 2016, which in turn is a divisional of U.S. application Ser. No. 14/667,433, filed on Mar. 24, 2015, (now U.S. Pat. No. 9,431,031), the entireties of which are incorporated by reference herein.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction. The central sensor reads the data from a track of interest, while the outer sensors sense the data in adjacent tracks in order to account for noise.

Although TDMR might be capable of higher recording densities, issues may complicate fabrication of a read transducer or adversely affect its performance. Fabrication of an additional read sensor above the read sensor 14 shown, in place of the shield 20, may be complicated. Further, the shields 12 and 20 and the magnetic bias structures 16 are desired to be biased. The free layers of the read sensors are also magnetically biased in a different direction from the shields and magnetic bias structures. Providing the desired magnetic biasing of the shields and read sensors may be difficult to accomplish. Consequently, a transducer suitable for use in TDMR is desired.

DETAILED DESCRIPTION

Figure 1:
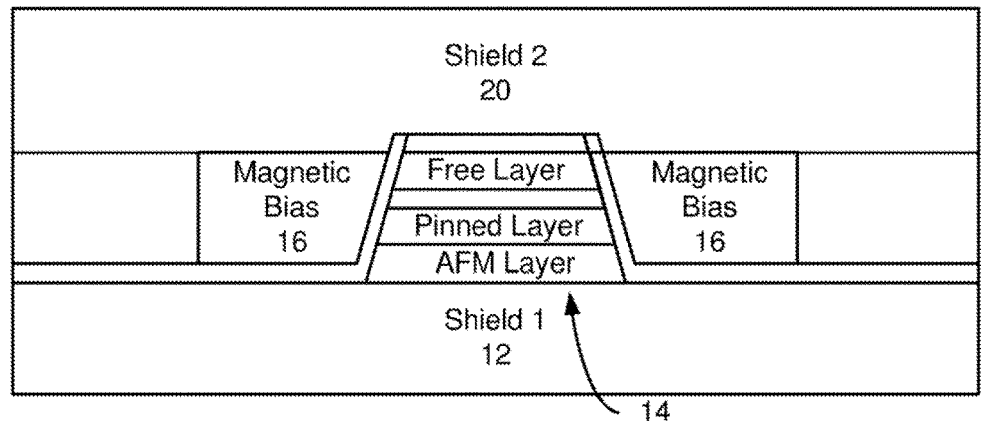
FIG. 1 depicts a conventional read transducer.
Figure 2A:
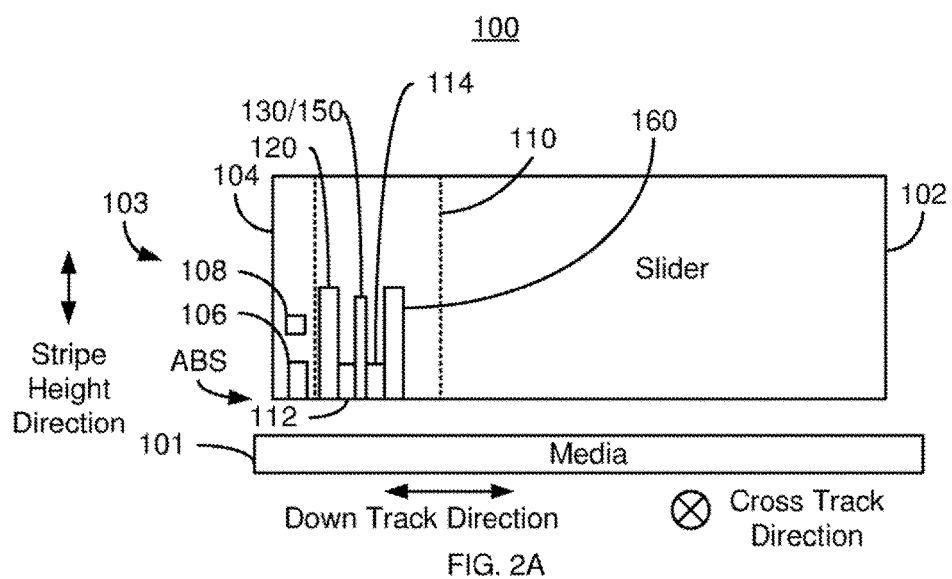
FIG. 2A-2C depict side, ABS and plan views an exemplary embodiment portions of a disk drive.
Figure 2B:
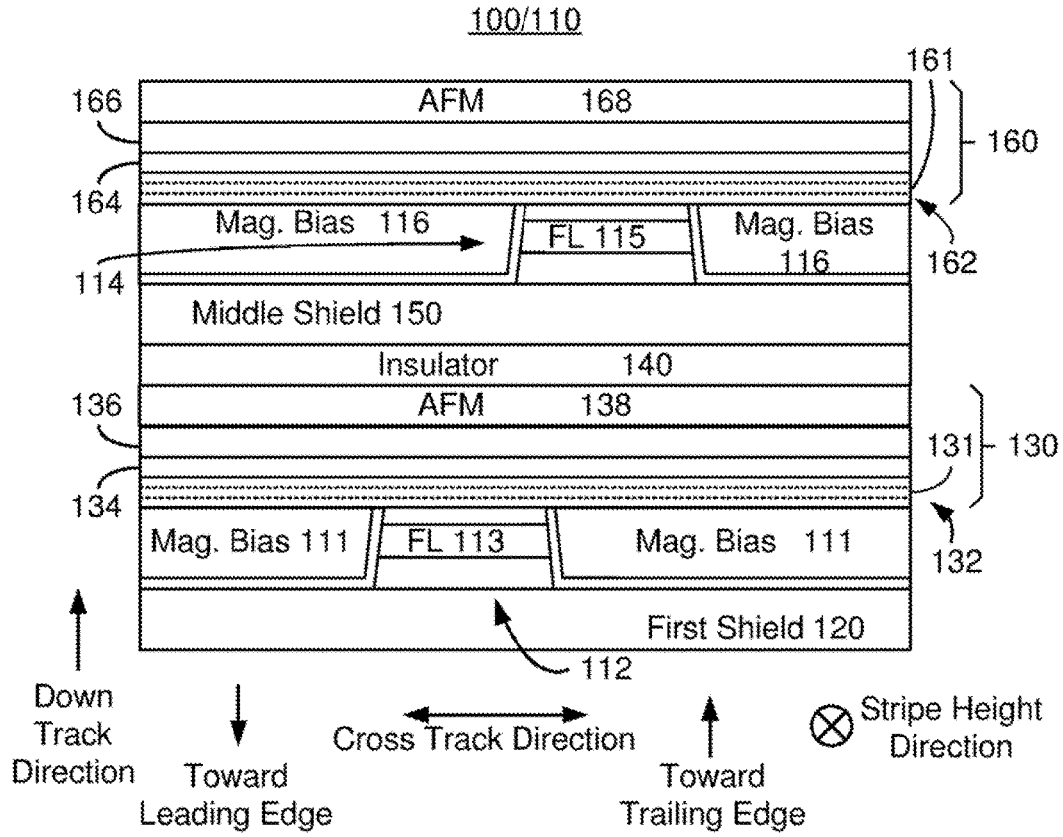
Figure 2C:
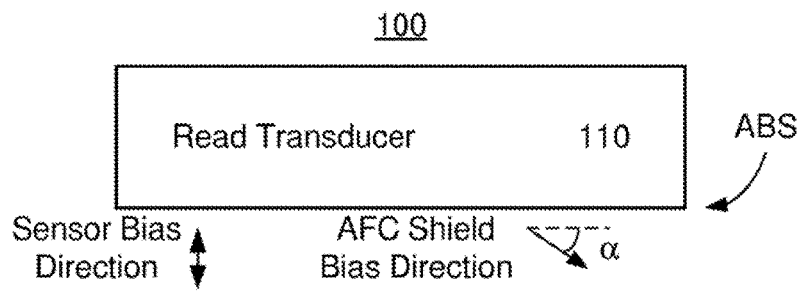

FIGS. 2A-2C depict side, ABS and plan views of a portion of a disk drive 100. For clarity, FIGS. 2A-2C are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present. Further, multiple read and/or write transducers may be used. The read transducer 110 includes multiple read sensors 112 and 114, shields 120 and 160 and middle shield(s) 130/150. In addition, magnetic bias structures 111 and 116 for the sensors 112 and 114, respectively, are used.

The read transducer 110 includes multiple read sensors 112 and 114 having sensor layers 113 and 115, respectively, that may be free layers in a giant magnetoresistive (GMR) sensor or a tunneling magnetoresistive (TMR) sensor. Thus, each sensor 112 and 114 may include a pinning layer, a pinned layer and a nonmagnetic spacer layer in addition to the free layer 113 and 115, respectively. For simplicity, only the free layers 113 and 115 are separately labeled. The sensors 112 and 114 may also include other layers such as seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113 and 115 are each shown as a single layer, but may include multiple layers including but not limited to a synthetic antiferromagnetic (SAF) structure. The pinned layer may also be a simple layer or a multilayer. Although shown as extending the same distance from the ABS in FIG. 2A, the pinned layer may extend further than the corresponding free layer 113 and/or 115. The nonmagnetic spacer layer may be a conductive layer, a tunneling barrier layer, or other analogous layer. Although depicted as a GMR or TMR sensor, in other embodiments, other structures and other sensing mechanisms may be used for the sensor. In other embodiments, however, other sensors may be used. For example, the sensor 112 and/or 114 may employ a dual free layer scheme in which two free layers that are biased in a scissor stated are utilized.

The read sensors 112 and 114 may have different widths in the track width, or cross-track, direction. However, in other embodiments, the widths of the sensors 112 and 114 may be the same. The widths of the sensors 112 and 114 may also be based on the track pitch. In the embodiment shown, the read sensors 112 and 114 are offset in the cross track direction. Therefore, the centers of each of the read sensors 112 and 114 are not aligned along a line that runs the down track direction. In other embodiments, the read sensors 112 and 114 might be aligned. The read sensor 114 is also in a down track direction from the read sensor 112. The read sensor 114 is thus closer to the trailing edge of the slider 102 than the read sensor 112 is.

Also shown are bias structures 111 and 116 that magnetically bias the read sensors 112 and 114, respectively. The magnetic bias structure(s) 111 and/or 116 may be soft bias structures fabricated with soft magnetic material(s). In other embodiments, the magnetic bias structure(s) 111 and/or 116 may be hard magnetic bias structures. In still other embodiments, the magnetic bias structure(s) 111 and/or 116 may have both magnetically hard and magnetically soft regions. Other mechanisms for biasing the sensors 112, and 114 might also be used.

The read sensors 112 and 114 are separated by middle shield(s) 130/150. In embodiments in which only a single middle shield is used, then the insulator 140 may be omitted. The read sensors 112 and 114 and shield 130 are surrounded by first (bottom) shield 120 and second (top) shield 160. In the embodiment shown in FIGS. 2A-2C, there are two read sensors 112 and 114 and two middle shields 130 and 150. However, in another embodiment, another number of read sensors and middle/internal shields may be present. The middle shield 130 might be considered to be a top middle shield because it is closest to and may be electrically coupled with the top of the sensor 112. The middle shield 150 may be a bottom middle shield because it is closest to and may be electrically coupled with the bottom of the sensor 114.

The bottom middle shield 150 is a monolithic shield. In the embodiment shown, the bottom middle shield 150 includes a single typically soft magnetic layer. In other embodiments, multiple material(s) and/or layers may be used. For example, the bottom middle shield 150 may include a NiFe layer and/or a CoFe layer.

The top middle shield 130 is an antiferromagnetically coupled (AFC) shield. The AFC middle shield 130 includes multiple magnetic layers 132 and 136 separated by a nonmagnetic layer 134 and magnetically coupled to an antiferromagnetic (AFM) layer 138. Although not shown, seed and/or capping layer(s) may be used. The magnetic layers 132 and 136 are antiferromagnetically coupled, typically via a Ruderman-Kittel-Kasuya-Yosida (RKKY) interaction. The ferromagnetic layers 132 and/or 134 may include multiple sublayers. For example, the bottom ferromagnetic layer 132 may include a thin amorphous layer 131, such as a CoFeB insertion layer. In some embodiments, the bottom layer 132 consists of NiFe layers separated by a thin CoFeB insertion layer 131 and topped by a CoFe layer. For example the bottom layer may include at least two hundred and not more than three hundred Angstroms of NiFe topped by not more than ten Angstroms of CoFeB, at least twenty-five Angstroms and not more than thirty five Angstroms of NiFe and at least five and not more than fifteen Angstroms of CoFe closest to the nonmagnetic layer 134. However other thicknesses and materials may be present. The top ferromagnetic layer 136 may include multiple magnetic layers. For example, the top ferromagnetic layer 136 may include CoFe layers separated by a NiFe layer. For example, the ferromagnetic layer 136 may consist of at least five and not more than fifteen Angstroms of CoFe, at least two hundred and not more than three hundred Angstroms of NiFe and topped by at least fifteen and not more than twenty five Angstroms of CoFe. However, other thicknesses and other materials may be used. An amorphous magnetic layer such as the CoFeB insertion layer 131 discussed above might also be used in the ferromagnetic layer 136. Use of the thin CoFeB insertion layer 131 within the layer 132 and/or 126 may be desired to improve the thermal stability of the AFC shield 130.

The nonmagnetic layer 136 has a thickness configured to be within an antiferromagnetic coupling peak (in a plot magnetic coupling versus thickness) of the RKKY interaction. In some embodiments, the nonmagnetic layer 136 is within the first antiferromagnetic peak of the RKKY interaction. In other embodiments, the nonmagnetic layer 136 is within the second antiferromagnetic peak of the RKKY interaction. In some cases, the second antiferromagnetic peak of the RKKY interaction is preferred for thermal stability of the shield 130. The nonmagnetic layer 136 includes conductive nonmagnetic material(s) for which the layers 132 and 136 may be antiferromagnetically coupled. For example, the nonmagnetic layer 136 may consist of Ru and may have a thickness of at least three and not more than ten Angstroms.

The AFM layer 138 is used to bias the magnetic moment of the ferromagnetic layer 136. For example, the AFM layer 138 may include IrMn. Thus, the AFM layer 138 may be thick enough to pin the magnetic moment of the ferromagnetic layer 136. In addition, the thickness of the AFM layer 138 may also be set to improve manufacturability of the transducer 110. For example, the AFM layer 138 may also be sufficiently thin that the direction of the moments within the AFM layer 138 (i.e. the direction in which the spins are aligned parallel and antiparallel) may be set at an anneal temperature that is lower than the anneal temperature used for the sensors 112 and 114. For example, in some embodiments, one or more of the anneal(s) used in fabricating the sensor(s) 112 and/or 114 utilizes temperatures in excess of 270 degrees Celsius. Thus, the thickness of the AFM layer 138 may be set such that an anneal of not more than 240 degrees Celsius can be used to set the direction of the moments in the AFM and, therefore, the bias direction for the ferromagnetic layer 136. In some embodiments, anneals of not more than 220 degrees Celsius may be used to set the direction of the moments in the AFM layer 138. The thickness of the AFM layer 138 may thus be set such that fabrication/annealing for the AFC shield 130 does not adversely affect the read sensor(s) 112 and/or 114, so that the anneal for the AFC shield 130 may set the direction at which the layer 136 is magnetically biased and such that the AFC shield 130 is stable during operation of the transducer 110. In some embodiments, the AFM layer 138 has a thickness of not more than one hundred sixty Angstroms. In some such embodiments, the AFM layer 138 has a thickness of not more than one hundred Angstroms.

In the embodiment shown, the second (top) shield 160 is also an AFC shield. The second AFC shield 160 includes multiple magnetic layers 162 and 166 separated by a nonmagnetic layer 164 and magnetically coupled to an AFM layer 168. Although not shown, seed and/or capping layer(s) may be used. The magnetic layers 162 and 166 are antiferromagnetically coupled, typically via the RKKY interaction. The ferromagnetic layers 162 and/or 164 may include multiple sublayers. For example, layer 162 may be analogous to the layer 132, while the layer 166 may be analogous to the layer 136. Thus, the bottom layer 162 may include NiFe layers separated by a thin CoFeB insertion layer 161 and topped by a CoFe layer that may all be in the thickness ranges described above. The top ferromagnetic layer 166 may include CoFe layers separated by a NiFe layer that may be in the thickness ranges discussed above. In other embodiments, other and/or additional materials may be used for the layers 162 and/or 166. The nonmagnetic layer 164 may be analogous to the layer 134. For example, the nonmagnetic layer 164 may have a thickness within the first or second antiferromagnetic peak of the RKKY interaction. The AFM layer 168 may be thick enough to pin the magnetic moment of the ferromagnetic layer 166, thin enough to have the magnetic moment direction set with anneal(s) that do not adversely affect the sensor(s) 112 and 114, thick enough that the top shield 160 is stable during operation and may include IrMn.

In the embodiment shown the first (bottom) shield 120 and the bottom middle shield 150 are monolithic shields. The top middle shield 130 and second (top) shield 160 are AFC shields. It may be desirable for the shields surrounding the sensors 112 and 114 to be configured similarly. For example, if the bottom middle shield 150 were an AFC shield, then the first (bottom) shield 120 may be desired to be an AFC shield. Thus, although the shields 120, 130, 150 and 160 are shown as having a particular structure (monolithic or AFC), in other embodiments, the structure might be different.

During fabrication, the magnetic transducer 110 undergoes various anneals in order to set the magnetization/magnetic bias directions of various magnetic components of the transducer 110. FIG. 2C depicts embodiments of some of the magnetic biases. The read sensors 112 and 114 may be magnetically biased in the same direction. For example, the read sensors are generally biased perpendicular to the ABS. Thus, the stable states of the magnetic moments of the free layers 113 and 115 may be perpendicular to the ABS. The top middle shield 130 and/or the second (top) shield 160 may also be desired to be magnetically biased in a particular direction. For example, the middle shield 130 and/or the second shield 160 may be desired to be bias at an angle, .alpha., from the ABS. This angle may be at least zero degrees and not more than fifty-five degrees from the ABS. In some embodiments, .alpha. is not more than forty-five degrees from the ABS. In some such embodiments, .alpha. is at least thirty degrees and not more than forty degrees from the ABS. Note that the magnetic field with which the transducer 110 is annealed to set the direction of the AFM layer 138/168 spin during fabrication may point in a direction other than at the angle .alpha. from the ABS. The direction of the magnetic field used is set based at least upon the desired angle, .alpha., the thicknesses of the AFM layers 138 and 168 and the magnetic states of the AFM layers 138 and 168 before the anneal. Thus, the desired structure 110 may be obtained.

In operation, current is driven perpendicular-to-plane for the sensors 112 and 114. Thus, current is driven through the sensor 112 between the shields 120 and 130. Similarly, current is driven through the sensor 114 between the shields 150 and 160. Thus, electrical connection is to be made to the shields 120, 130, 150 and 160. However, different currents may be driven through the sensors 112 and 114 because of the presence of the insulator 140. Similarly, the resistances of the sensors 112 and 114 may be separately sensed.

The magnetic read transducer 110 and disk drive 100 may have improved performance and manufacturability. Because multiple sensors 112 and 114 employed, the magnetic transducer 110 may then be used at higher data rates and/or densities in TDMR. The desired magnetic biasing of the sensors 112 and 114 and shields 120, 130, 150 and 160 and the bias structures 111 and 116 may also be accomplished. The presence of the amorphous CoFeB insertion layer 131/161 in the layer 132 and/or 162 may improve the thermal stability of the AFC shield(s) 130 and/or 160. Configuration of the thickness of the nonmagnetic layer 134/164, for example to be in the second antiferromagnetic peak in the RKKY interaction, may also improve thermal stability of the AFC shield(s) 130 and/or 160. Performance and fabrication of the magnetic transducer 110 may, therefore, be improved.

Figure 3:
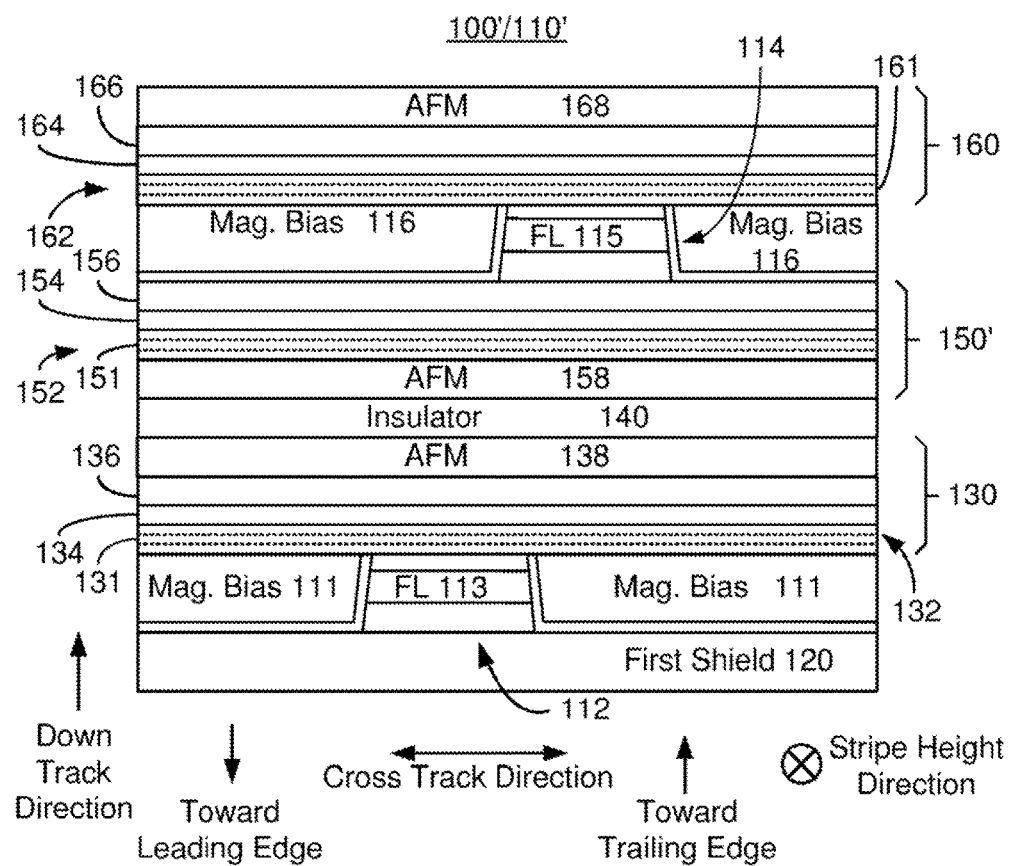
FIG. 3 depicts an ABS view of another exemplary embodiment of a portion of a magnetic recording read transducer including multiple read sensors.

FIG. 3 depicts an ABS view of an exemplary embodiment of a transducer 110' that is part of a disk drive 100'. For clarity, FIG. 3 is not to scale. For simplicity not all portions of the disk drive 100' and transducer 110' are shown. The transducer 110' and disk drive 100' depicted in FIG. 3 are analogous to the read transducer 110 and disk drive 100 depicted in FIGS. 2A-2C. Consequently, analogous components have similar labels. For simplicity, only a portion of the transducer 110' and disk drive 100' are shown in FIG. 3.

The transducer 110' includes first shield 120, read sensors 112 and 114, magnetic bias structures 111 and 116, AFC (top) middle shield 130, insulator 140, bottom middle shield 150' and second shield 160 that are analogous to the first shield 120, read sensors 112 and 114, magnetic bias structures 111 and 116, and AFC (top) middle shield 130, insulator 140, top middle shield 150 and second shield 160 depicted in FIGS. 2A-2C, respectively. The transducer 110' thus operates in a similar manner to the transducer 110. Thus the top middle shield 130 includes amorphous layer 131, magnetic layer 132, nonmagnetic layer 134, magnetic layer 136 and AFM layer 138 that are analogous to amorphous ferromagnetic layer 131, ferromagnetic layer 132, nonmagnetic layer 134, ferromagnetic layer 136 and an AFM layer 138, respectively, in FIGS. 2A-2C. Other layers could also be included in the AFC shield 130. Similarly, second (AFC) shield 160 includes amorphous layer 161, magnetic layer 162, nonmagnetic layer 164, magnetic layer 166 and AFM layer 168 that are analogous to amorphous magnetic layer 161, magnetic layer 162, nonmagnetic layer 164, magnetic layer 166 and AFM layer 168, respectively, in FIGS. 2A-2C.

In the embodiment shown, the bottom middle shield 150' is an AFC coupled shield instead of a monolithic shield. Thus, the bottom middle shield 150' includes multiple magnetic layers 152 and 156 separated by a nonmagnetic layer 154 and magnetically coupled to an AFM layer 158. Although not shown, seed and/or capping layer(s) may be used. The magnetic layers 152 and 156 are antiferromagnetically coupled, typically via an RKKY interaction. The ferromagnetic layers 152 and/or 154 may include multiple sublayers. For example, the bottom layer 152 may include a thin amorphous layer 151, such as a CoFeB insertion layer. In some embodiments, the bottom layer 152 consists of NiFe layers separated by a thin CoFeB insertion layer 151 and topped by a CoFe layer. The top ferromagnetic layer 156 may include CoFe layers separated by a NiFe layer. The thicknesses and layers used may thus be analogous to those used for the AFC shields 130 and 160. However, other thicknesses and other materials may be used. The AFM layer 158 may be thick enough to pin the magnetic moment of the ferromagnetic layer 156, thin enough that the anneal that sets the direction of the magnetic moments for the AFM layer 158 does not adversely affect the sensor 112 and sufficiently thick that the transducer 110' is stable during operation. For example, the AFM layer 158 may include IrMn.

The nonmagnetic layer 156 has a thickness configured to be within an antiferromagnetic coupling peak (in a plot magnetic coupling versus thickness) of the RKKY interaction. In some embodiments, the nonmagnetic layer 156 is within the first antiferromagnetic peak of the RKKY interaction. In other embodiments, the nonmagnetic layer 156 is within the second antiferromagnetic peak of the RKKY interaction. In some cases, the second antiferromagnetic peak of the RKKY interaction is preferred. The nonmagnetic layer 156 includes conductive nonmagnetic material(s) for which the layers 152 and 156 may be antiferromagnetically coupled. For example, the nonmagnetic layer 156 may consist of Ru and may have a thickness of at least three and not more than ten Angstroms. In the embodiment shown, the AFC shield 150' is a bottom middle shield and different from the first (bottom) shield 120, which is monolithic. In some embodiments, however, the shields 120 and 150' are desired to match. Thus, the first shield 120 might also be an AFC shield. The AFC shields 130, 150' and 160 are biased, annealed and configured in an analogous manner to the AFC shields 130 and 160 discussed above.

The magnetic read transducer 110' and disk drive 100' shares the benefits of the transducer 110 and disk drive 100. Thus, the transducer 110' may have improved performance and manufacturability.

Figure 4:
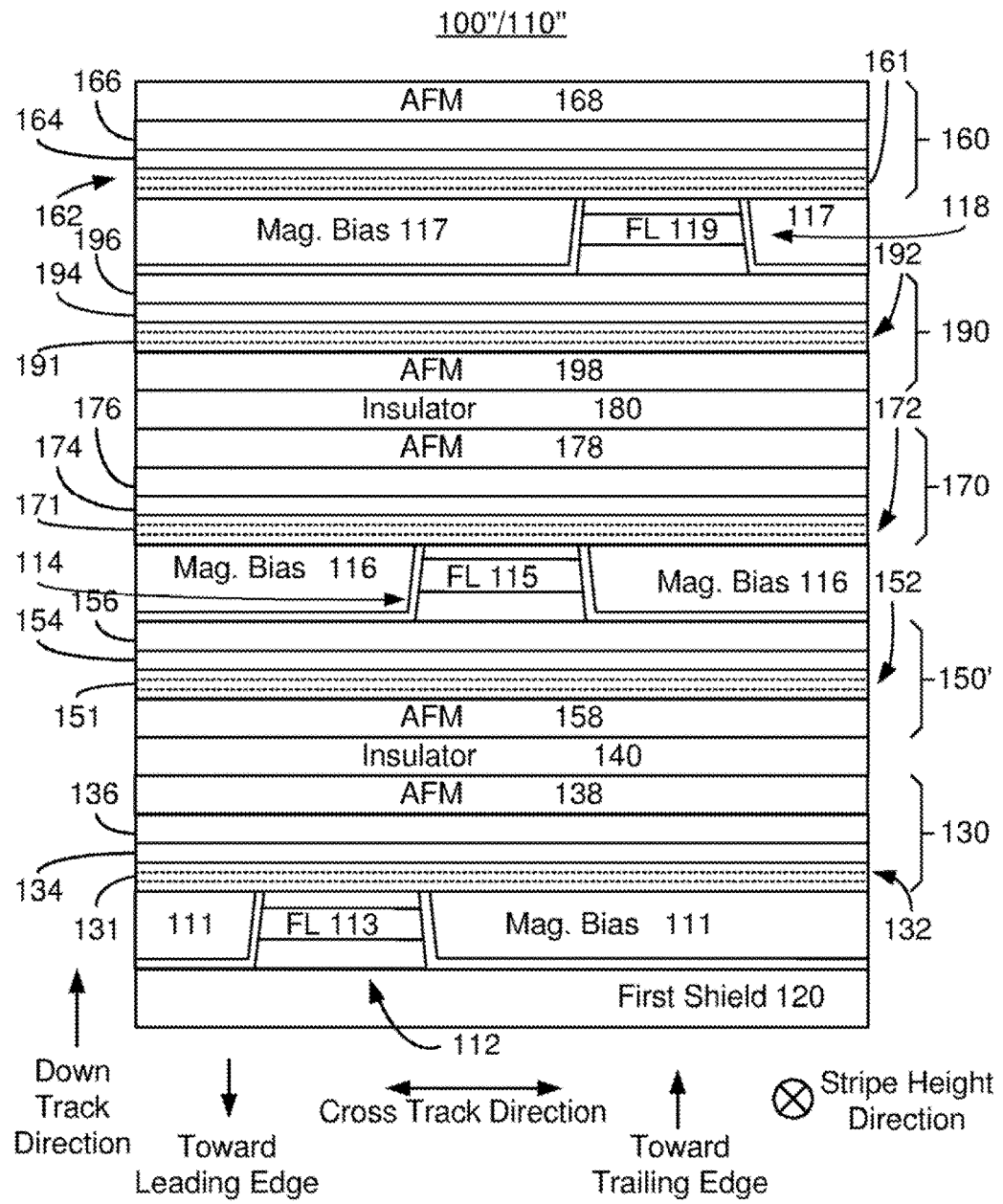
FIG. 4 depicts an ABS view of another exemplary embodiment of a portion of a magnetic recording read transducer including multiple read sensors.

FIG. 4 depicts an ABS view of an exemplary embodiment of a transducer 110" that is part of a disk drive 100". For clarity, FIG. 4 is not to scale. For simplicity not all portions of the disk drive 100" and transducer 110" are shown. The transducer 110" and disk drive 100" depicted in FIG. 4 are analogous to the read transducer 110/110' and disk drive 100/100' depicted in FIGS. 2A-2C and 3. Consequently, analogous components have similar labels. For simplicity, only a portion of the transducer 110" and disk drive 100" are shown in FIG. 4.

The transducer 110" includes first shield 120, read sensors 112 and 114, magnetic bias structures 111 and 116, AFC (top) middle shield 130, insulator 140, bottom middle shield 150' and second shield 160 that are analogous to the first shield 120, read sensors 112 and 114, magnetic bias structures 111 and 116, and AFC (top) middle shield 130, insulator 140, top middle shield 150 and second shield 160 depicted in FIGS. 2A-3, respectively. The transducer 110" thus operates in a similar manner to the transducer 110. Thus the top middle shield 130 includes amorphous layer 131, magnetic layer 132, nonmagnetic layer 134, magnetic layer 136 and AFM layer 138 that are analogous to amorphous ferromagnetic layer 131, ferromagnetic layer 132, nonmagnetic layer 134, ferromagnetic layer 136 and an AFM layer 138, respectively, in FIGS. 2A-3. Other layers could also be included in the AFC shield 130. Similarly, second (AFC) shield 160 includes amorphous layer 161, magnetic layer 162, nonmagnetic layer 164, magnetic layer 166 and AFM layer 168 that are analogous to amorphous magnetic layer 161, magnetic layer 162, nonmagnetic layer 164, magnetic layer 166 and AFM layer 168, respectively, in FIGS. 2A-3. The bottom middle (AFC) shield 150' includes amorphous layer 151, magnetic layer 152, nonmagnetic layer 154, magnetic layer 156 and AFM layer 158 that are analogous to amorphous magnetic layer 151, magnetic layer 152, nonmagnetic layer 154, magnetic layer 156 and AFM layer 158, respectively, in FIGS. 2A-3.

In the embodiment shown in FIG. 4, the transducer 110" includes an additional sensor 118, an additional top middle shield 170, an additional bottom middle shield 190 and an additional insulator 180. The additional sensor 118 is analogous to the sensors 112 and 114. Thus, the additional sensor 118 may have a free layer 119 and is biased by magnetic bias structures 117. In the embodiment shown, the middle shields 170 and 190 are AFC shields. The top middle shield 170 includes multiple magnetic layers 172 and 176 separated by a nonmagnetic layer 174 and magnetically coupled to an AFM layer 178. Although not shown, seed and/or capping layer(s) may be used. The bottom middle shield 190 includes multiple magnetic layers 192 and 196 separated by a nonmagnetic layer 194 and magnetically coupled to an AFM layer 198. Although not shown, seed and/or capping layer(s) may be used. The AFC shields 170 and 190 are analogous to the AFC shields 130, 150' and 160. Thus, the layers 171 and 191, 172 and 192, 174 and 194, 176 and 196 and 178 and 198 are analogous to the layers 131/151/161, 132/152/162, 134/154/164, 136/156/166, 138/158/168, respectively. However, in other embodiments, one or both of the shields 170 and 190 may be monolithic. Although the first shield 120 is shown as being monolithic, in another embodiment, the first shield 120 may be an AFC shield. Although all remaining shields 130, 150', 160, 170 and 190 are shown in FIG. 4 as being AFC shields, in other embodiments, only some shields 130, 150, 160, 170 and/or 190 are AFC shields. For example, in some embodiments, only the top middle shields 130 and 170 and second (top) shield 160 are AFC coupled shields. In such embodiments, the bottom middle shields 150' and 190 and first (bottom) shield 120 are monolithic shields. Such an embodiment may be preferred because the sensors 112, 114 and 118 are surrounded by analogous structures. The AFC shields 130, 150', 160, 170 and 190 are biased, annealed and configured in an analogous manner to the AFC shields 130, 150' and 160 discussed above.

The magnetic read transducer 110" and disk drive 100" shares the benefits of the transducer 110/110' and disk drive 100/100'. Thus, the transducer 110" may have improved performance and manufacturability.

Figure 5:
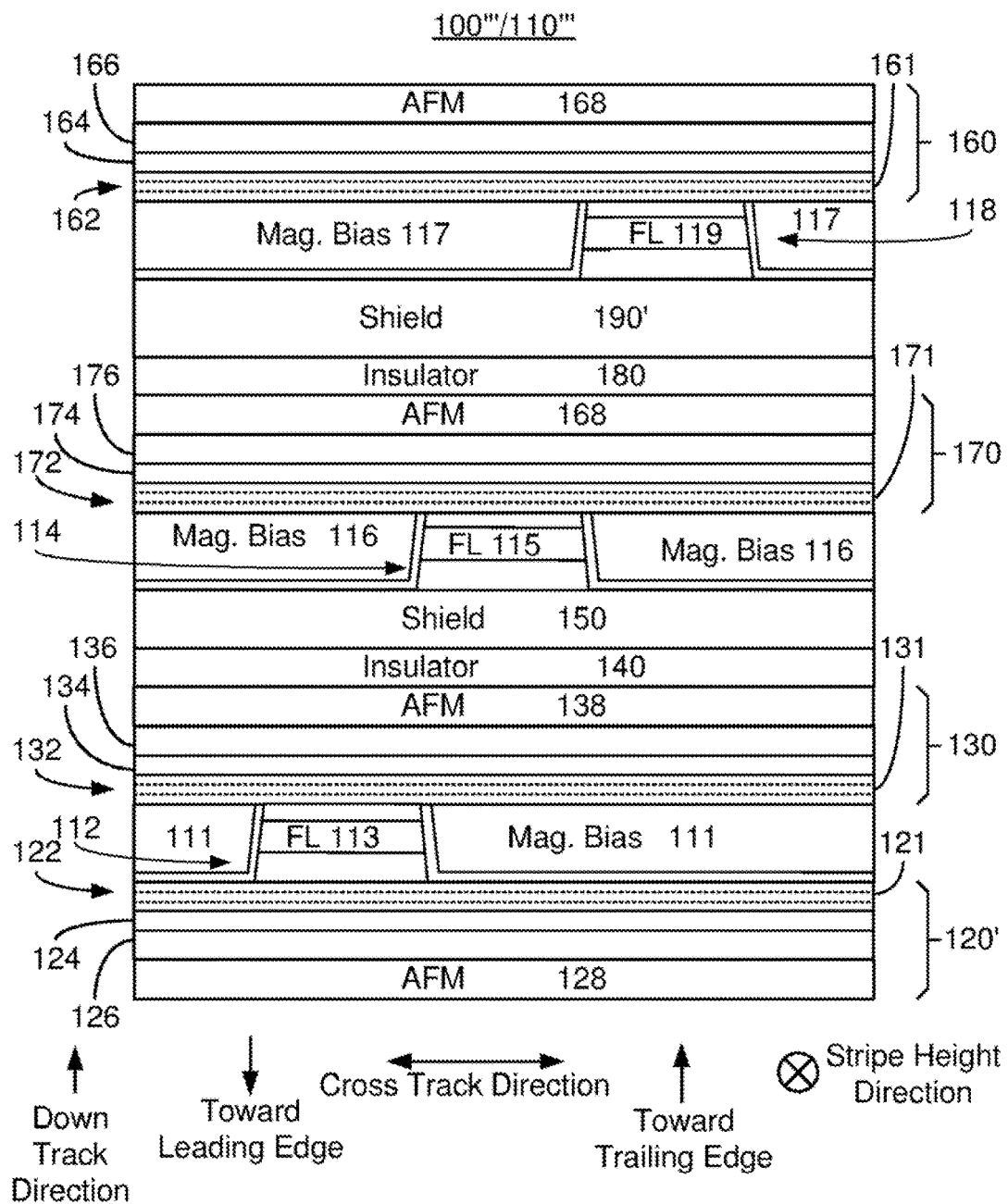
FIG. 5 depicts an ABS view of another exemplary embodiment of a portion of a magnetic recording read transducer including multiple read sensors.

FIG. 5 depicts an ABS view of an exemplary embodiment of a transducer 110' that is part of a disk drive 100'''. For clarity, FIG. 5 is not to scale. For simplicity not all portions of the disk drive 100''' and transducer 110''' are shown. The transducer 110''' and disk drive 100''' depicted in FIG. 5 are analogous to the read transducer 110/110'/110" and disk drive 100/100'/100" depicted in FIGS. 2A-2C, 3 and 4. Consequently, analogous components have similar labels. For simplicity, only a portion of the transducer 110''' and disk drive 100''' are shown in FIG. 5.

The transducer 110''' includes first shield 120', read sensors 112, 114 and 118, magnetic bias structures 111, 116 and 117, top middle shields 130 and 170, insulators 140 and 180, bottom middle shields 150 and 190' and second shield 160 that are analogous to the first shield 120, read sensors 112, 114 and 118, magnetic bias structures 111, 116 and 117, and top middle shields 130 and 170, insulators 140 and 180, top middle shields 150/150' and 190 and second shield 160 depicted in FIGS. 2A-4, respectively. The transducer 110''' thus operates in a similar manner to the transducer 110. The top middle shield 130 includes amorphous layer 131, magnetic layer 132, nonmagnetic layer 134, magnetic layer 136 and AFM layer 138 that are analogous to amorphous ferromagnetic layer 131, ferromagnetic layer 132, nonmagnetic layer 134, ferromagnetic layer 136 and an AFM layer 138, respectively, in FIGS. 2A-4. Other layers could also be included in the AFC shield 130. Similarly, second (AFC) shield 160 includes amorphous layer 161, magnetic layer 162, nonmagnetic layer 164, magnetic layer 166 and AFM layer 168 that are analogous to amorphous magnetic layer 161, magnetic layer 162, nonmagnetic layer 164, magnetic layer 166 and AFM layer 168, respectively, in FIGS. 2A-3. The bottom middle shields 150 and 190' are monolithic in the embodiment shown. Top middle shield 170 includes amorphous layer 171, magnetic layer 172, nonmagnetic layer 174, magnetic layer 176 and AFM layer 178 that are analogous to amorphous magnetic layer 171, magnetic layer 172, nonmagnetic layer 174, magnetic layer 176 and AFM layer 178, respectively, in FIG. 4.

In the embodiment shown in FIG. 5, the first (bottom shield) 120' is an AFC shield. Thus, the first shield 120' includes multiple magnetic layers 122 and 126 separated by a nonmagnetic layer 124 and magnetically coupled to an AFM layer 128. The AFC shield 120' is analogous to the AFC shields 130, 150', 170 and 160. Thus, the layers 121, 122, 124, 126 and 128 are analogous to the layers 131/151/ 161/171/191, 132/152/162/172/192, 134/154/164/174/194, 136/156/166/176/196, 138/158/168/178/198, respectively. Although the first shield 120' is shown as being an AFC shield, in another embodiment, the first shield 120 may be a monolithic shield. Although shields 130, 160 and 170 are shown as being AFC shields, in other embodiments, only some shields 130, 160 and/or 170 AFC shields. Similarly, although the shields 150 and 190' are shown as being monolithic, in other embodiments, one or both of the shield 150 and 190' may be AFC shields. The AFC shields 120', 130, 170 and 160 are biased, annealed and configured in an analogous manner to the AFC shields 130, 150', 160, 170 and 190 discussed above.

The magnetic read transducer 110''' and disk drive 100''' shares the benefits of the transducer 110/110'/110'' and disk drive 100/100'/100''. Thus, the transducer 110''' may have improved performance and manufacturability.

Figure 6:
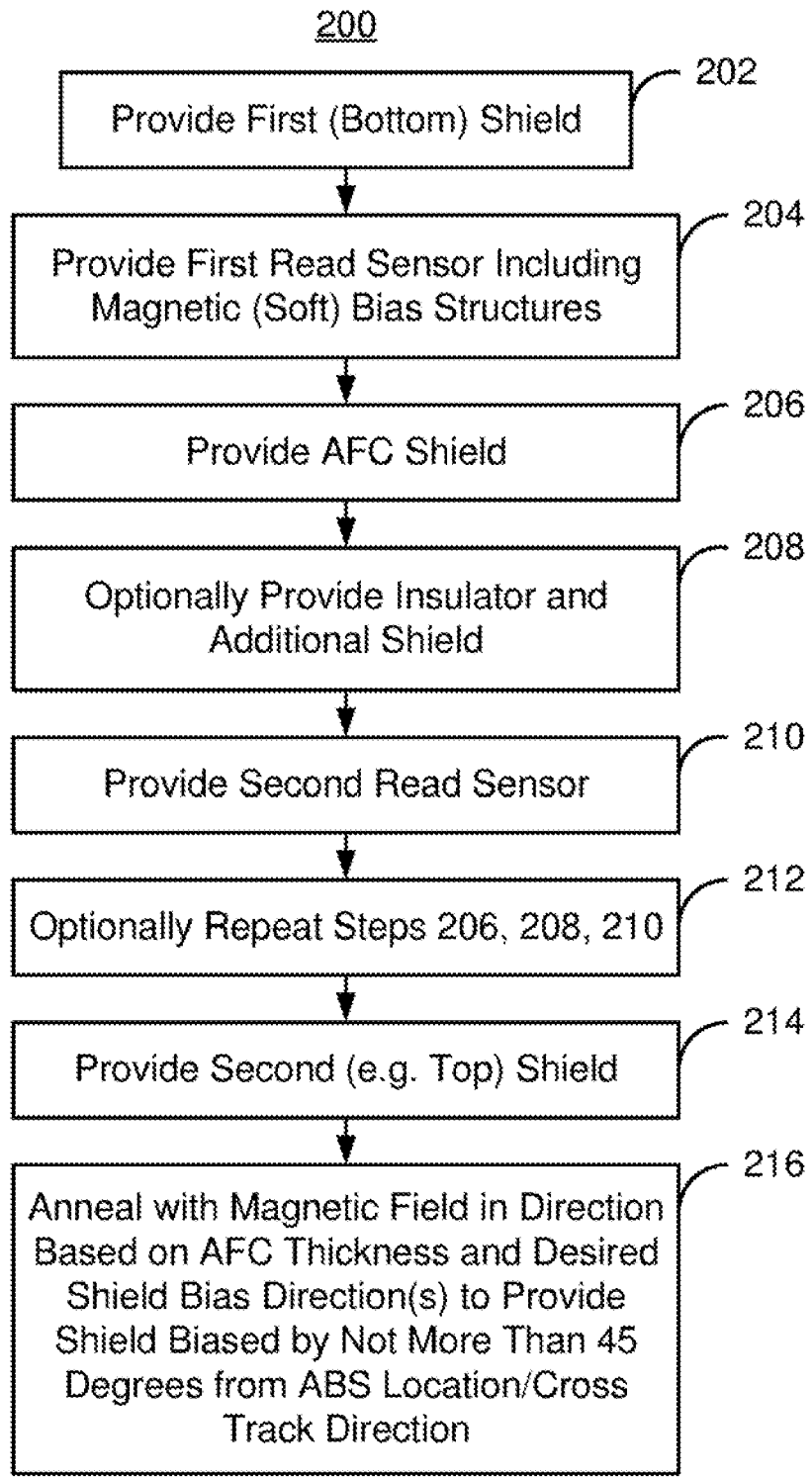
FIG. 6 is a flow chart depicting an exemplary embodiment of a method for fabricating a magnetic recording read transducer including multiple read sensors.

FIG. 6 is an exemplary embodiment of a method 200 for providing a read transducer having multiple sensors. Some steps may be omitted, interleaved, and/or combined. For simplicity, the method 200 is described in the context of providing a single recording transducer 110. However, other magnetic recording transducers 110', 110'' and/or 110''' may be manufactured. Further, the method 200 may be used to fabricate multiple transducers at substantially the same time. The method 200 may also be used to fabricate other transducers. The method 200 is also described in the context of particular layers. A particular layer may include multiple materials and/or multiple sub-layers. The method 200 also may start after formation of other portions of the magnetic recording transducer.

The first shield 120 is provided, via step 202. Step 202 typically includes depositing (e.g. plating) a large high permeability layer. In alternate embodiments, in which the shield 120 is an AFC shield, step 202 includes depositing multiple ferromagnetic layers interleaved with and sandwiching at least one nonmagnetic layer and depositing an AFM layer adjoining one of the ferromagnetic layers. The layer may also be planarized.

The first read sensor 112 is provided, via step 204. Step 204 may include full-film depositing an AFM layer, a pinned layer, a nonmagnetic spacer (e.g. tunneling barrier) layer and a free layer 113. The read sensor 112 may also be defined in step 204. Step 204 may define the read sensor 112 in the cross track and/or the stripe height direction. The stripe height direction is perpendicular to the ABS. The magnetic bias structures 111 for the read sensor 112 may also be fabricated as part of step 204. Step 204 may also include annealing the portion of the transducer that has been fabricated. The anneal may be used to set the direction of magnetization of portions of read sensor stack and/or for other purposes. For example, the anneal may be in a magnetic field that is in the direction in which the read sensor is desired to be biased. In some embodiments, this direction is perpendicular to the ABS. This anneal may also be at a high temperature compared with the anneal(s) for the shield(s) 120, 130, 150 and/or 160. In some embodiments, the temperature for the anneal of the read sensor 112 is at least 250 degrees Celsius. The temperature may be at least 270 degrees Celsius in some cases.

The top middle shield 130 is provided, via step 206. Thus, step 206 generally includes providing an AFC shield. The ferromagnetic layers 132 and 136 and the nonmagnetic layer 134 are deposited to the desired thicknesses in step 206. As part of depositing the layer 132 and/or 136, an amorphous magnetic layer such as the CoFeB insertion layer 131 may also be deposited. Step 206 also includes depositing the antiferromagnetic layer 138 to the desired thickness.

An insulating layer 140 and an additional, bottom middle shield 150 may also be provided, via step 208. In some embodiments, the step 208 of providing the bottom middle shield 150 includes depositing a monolithic shield. In other embodiments, step 208 may include providing an AFC coupled shield. In such embodiments, this portion of step 208 is analogous to step 206.

The second read sensor 114 is provided, via step 210. Step 210 may include full-film depositing an AFM layer, a pinned layer, a nonmagnetic spacer (e.g. tunneling barrier) layer and a free layer 115. The read sensor 114 may also be defined in the cross track and/or the stripe height direction. The magnetic bias structures 116 for the read sensor 114 may also be fabricated as part of step 210. Step 210 may also include annealing the portion of the transducer that has been fabricated to set the direction of magnetization of portions of read sensor stack and/or for other purposes. For example, the anneal performed in step 210 may be analogous to the anneal for step 204.

Step 206, 208 and 210 may optionally be repeated a desired number of times, via step 212. Thus, a transducer, such as the transducer 110'' and/or 110''' having more than two read sensors may be fabricated.

The second shield 160 is provided, via step 214. Step 214 may include providing an AFC shield. Thus, step 214 may be performed in an analogous manner to step 206. The ferromagnetic layers 162 and 166 and the nonmagnetic layer 164 are deposited to the desired thicknesses in step 214. As part of depositing the layer 162 and/or 166, an amorphous magnetic layer such as the CoFeB insertion layer 161 may also be deposited. Step 214 also includes depositing the antiferromagnetic layer 168 to the desired thickness.

At least one anneal is performed for the shield(s), via 216. Thus, the shields 120, 130, 150 and 160 as well as read sensors 112 and 114 are annealed in a magnetic field in step 216. The anneal performed in step 216 is at temperature(s)

and magnetic field(s) that are sufficiently high to set the direction of the AFM layers' 138 and 168 moments and, therefore, the directions of magnetization for the layers 132, 136, 162 and 166. The temperature(s) of the anneal are also sufficiently low that the read sensors 112 and 114 are not adversely affected.

The anneal performed in step 216 is in a magnetic field at an angle from the location/plane which will form the ABS after lapping ("ABS location"). This angle is selected based on a thickness and a desired AFC shield bias direction for the AFM layer 138 and/or 168. The angle of the magnetic field is also selected such that the ADC shield(s) 130 and 160 are biased in the desired AFC shield bias direction after the anneal has been completed. In some embodiments, the angle between the magnetic field direction and the ABS location is at least zero degrees and not more than fifty-five degrees. In some cases, this angle is not more than forty-five degrees from the ABS location. Although the magnetic field angle is selected in part based on the desired AFC shield bias direction, the angle may be in a direction that is different from the desired AFC shield bias direction. It is the combination of the thickness of the AFM layer(s) 138 and/or 168, the pre-anneal magnetic state of the AFM layer(s) 138 and/or 168 and the angle the magnetic field makes with the ABS location that allows the resulting shields 130 and 160 to be magnetically biased in the desired AFC shield bias direction.

For example, in some embodiments, the desired AFC shield bias direction may be nominally thirty-five degrees from the ABS location. The pre-anneal state of the AFC shield 130 and/or 160 may be magnetically biased perpendicular to the ABS location because of the anneals of the sensors 112 and 114. This magnetic state may be due to the anneal of the sensor(s) in steps 204, 210 and, optionally, 212. The angle of the magnetic field during the anneal of step 216 may be at zero degrees for some thicknesses of the AFM layers 138 and 168. For such thicknesses of the AFM layer(s) 138/168 and given the magnetic state of the AFM layer 138/168 after the anneal(s) in steps 210 and 212, an anneal of the transducer 110 in a magnetic field at zero degrees from the ABS location results in the AFC shield(s) 130/160 being biased at nominally thirty-five degrees from the ABS location. Thus, the magnetic field angle for the anneal in step 216 is based on the thickness of the AFM layer 138/168 and may differ from the desired bias angle for the magnetic moments of the AFC shield(s) 130/160. Note that for some thicknesses of the AFM layer 138/168, however, the magnetic field angle may match the desired bias angle.

Using the method 200, the magnetic read transducer 110 and disk drive 100 may be provided. The transducers 110', 110" and/or 110''' may also be manufactured using the method 200. Because of the manner in which the anneals and other steps of the method 200 are performed, the desired geometry and magnetic properties of the transducers 110, 110', 110" and/or 110''' may be attained. The benefits of the transducers 110, 110', 110" and/or 110''' may thus be achieved.

Figure 7:
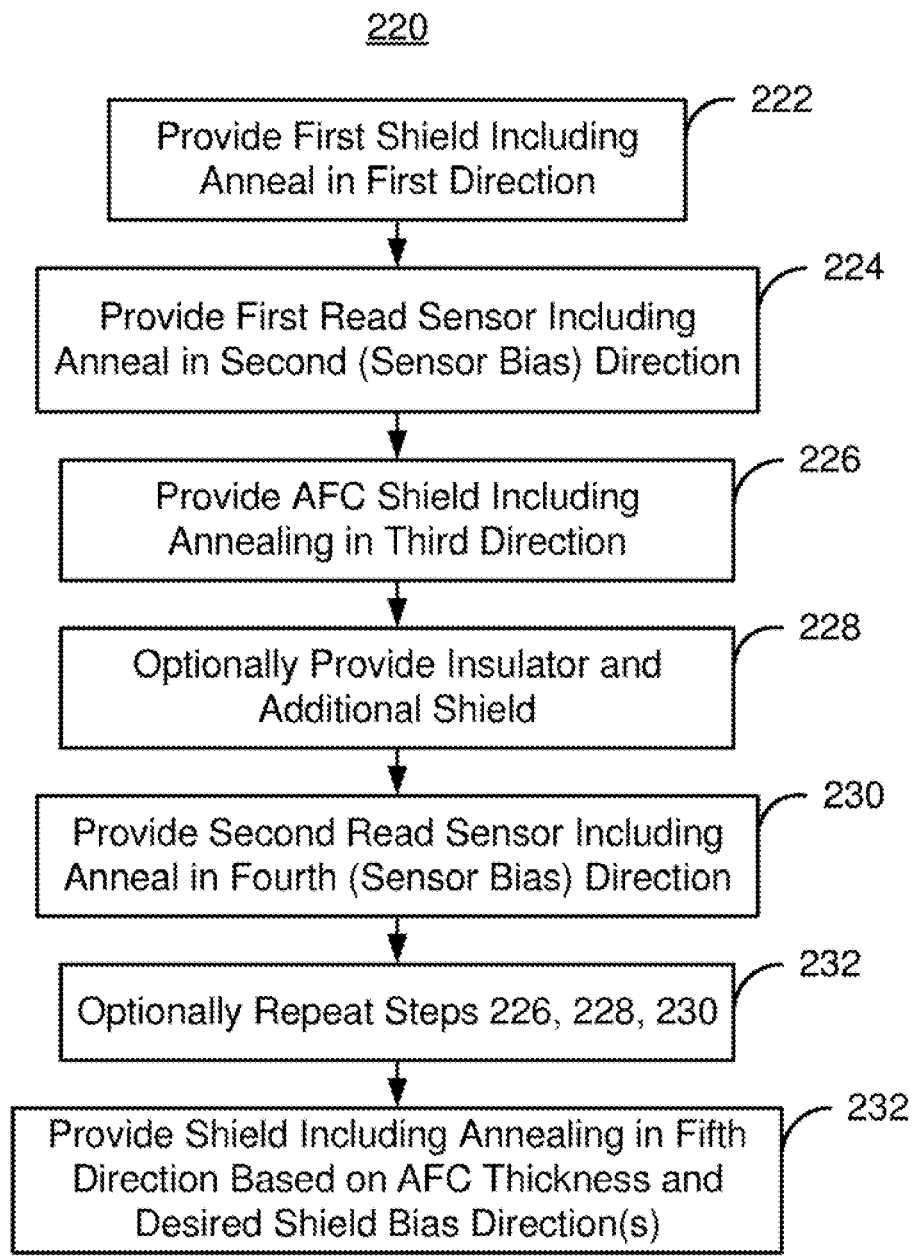
FIG. 7 is a flow chart depicting another exemplary embodiment of a method for fabricating a disk drive including a magnetic recording read transducer including multiple read sensors.

FIG. 7 is an exemplary embodiment of a method 220 for providing a read transducer having multiple sensors. Some steps may be omitted, interleaved, and/or combined. For simplicity, the method 220 is also described in the context of providing a single recording transducer 110. However, other magnetic recording transducers 110', 110" and/or 110''' may be manufactured. Further, the method 220 may be used to fabricate multiple transducers at substantially the same time. The method 220 may also be used to fabricate other transducers. The method 220 is also described in the context of particular layers. A particular layer may include multiple materials and/or multiple sub-layers. The method 220 also may start after formation of other portions of the magnetic recording transducer.

The first shield 120 is provided, via step 222. Step 222 typically includes depositing (e.g. plating) a large high permeability layer. The layer may also be planarized. In some embodiments, step 222 includes annealing the portion of the transducer 110 that has been fabricated. The anneal is at an elevated temperature and in a magnetic field. The magnetic field is in a direction from the ABS location. However, in other embodiments, particularly if the first shield 120 is monolithic, this anneal might be omitted.

The first read sensor 112 is provided, via step 224. Step 224 may be analogous to step 204. Thus, step 224 may include depositing the layers for the sensor 112 and annealing the portion of the transducer 110 that has been fabricated (including the sensor 112). The anneal may be used to set the direction of magnetization of portions of read sensor stack and/or for other purposes. The anneal may be in a magnetic field that is in the direction in which the read sensor is desired to be biased, for example perpendicular to the ABS. This anneal may also be at a high temperature compared with the anneal(s) for the shield(s) 120, 130, 150 and/or 160. In some embodiments, the temperature for the anneal of the read sensor 112 is at least 250 degrees Celsius. The temperature may be at least 270 degrees Celsius in some cases. The magnetic bias structures 111 for the read sensor 112 may also be fabricated as part of step 224.

The top middle shield 130 is provided, via step 226. Thus, step 226 includes providing an AFC shield. Step 226 is, therefore, analogous to step 206. In addition, at least one AFC shield anneal is also performed as part of step 226. Thus, the portion of the transducer 110 that has been formed is annealed in a magnetic field. The magnetic field is in a direction at an AFC shield anneal angle from the ABS location. This AFC shield anneal angle is at least zero degrees and not more than fifty-five degrees from the ABS location. In some embodiments, the magnetic field is at an angle of nominally forty-five degrees from the ABS location. The anneal performed in step 226 is at temperature(s) and magnetic field(s) that are sufficiently high to set the direction of the AFM layer 138 spins and, therefore, the directions of magnetization for the layers 132 and 136. The temperature(s) of the anneal are also sufficiently low that the read sensor 112 is not adversely affected.

An insulating layer 140 and an additional, bottom middle shield 150 may also be provided, via step 228. In some embodiments, the step 228 of providing the bottom middle shield 150 includes depositing a monolithic shield. In other embodiments, step 228 may include providing an AFC coupled shield. In such embodiments, this portion of step 228 is analogous to step 226. An anneal may optionally be performed for the bottom middle shield 150.

The second read sensor 114 is provided, via step 230. Step 230 may be analogous to step 210. The magnetic bias structures 116 for the read sensor 114 may also be fabricated as part of step 230. Step 230 may also include annealing the portion of the transducer that has been fabricated to set the direction of magnetization of portions of read sensor stack and/or for other purposes. For example, the anneal performed in step 230 may be analogous to the anneal for step 224.

Step 226, 228 and 230 may optionally be repeated a desired number of times, via step 232. Thus, a transducer, such as the transducer 110" and/or 110''' having more than two read sensors may be fabricated.

The second shield 160 is provided, via step 234. Step 234 may include providing an AFC shield. Thus, step 234 may be performed in an analogous manner to step 226. Step 234 also includes performing at least one anneal. Thus, the shields 120, 130, 150 and 160 as well as read sensors 112 and 114 are annealed in a magnetic field in step 234. The anneal performed in step 234 is at temperature(s) and magnetic field(s) that are sufficiently high to set the direction of the AFM layers' 138 and 168 moments and, therefore, the directions of magnetization for the layers 132, 136, 162 and 166. The temperature(s) of the anneal are also sufficiently low that the read sensors 112 and 114 are not adversely affected.

Like step 216 of the method 200, however, the anneal in step 234 is in a magnetic field at an angle from the ABS location. This angle is selected based on a thickness and a desired AFC shield bias direction for the AFM layer 138 and/or 168. In some embodiments, this angle is at least zero degrees and not more than fifty-five degrees from the ABS location. In some embodiments, this angle is not more than forty-five degrees from the ABS location. The angle may be in a direction that is different from the desired AFC shield bias direction. Thus, the magnetic field angle for the anneal in step 234 is based on the thickness of the AFM layer 138/168 and may differ from the desired bias angle for the magnetic moments of the AFC shield(s) 130/160. Note that for some thicknesses of the AFM layer 138/168, however, the magnetic field angle may match the desired bias angle.

Using the method 220, the magnetic read transducer 110 and disk drive 100 may be provided. The transducers 110', 110" and/or 110''' may also be manufactured using the method 220. Because of the manner in which the anneals and other steps of the method 220 are performed, the desired geometry and magnetic properties of the transducers 110, 110', 110" and/or 110''' may be attained. The benefits of the transducers 110, 110', 110" and/or 110''' may thus be achieved.

Figure 8:
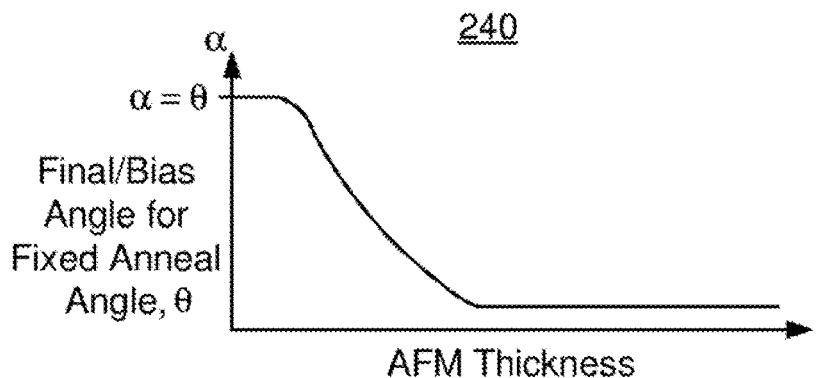
FIG. 8 is a graph depicting an exemplary embodiment of the bias angle versus antiferromagnetic layer thickness.

Referring to FIGS. 6 and 7, the magnetic angles selected for the anneals in steps 216 and 232 depend upon the thickness of the AFM layer 138 and/or 168 for the AFC shield(s) 130/160. This is indicated in FIG. 8, which is a graph 240 depicting the final bias angle, .alpha., versus thickness of the AFM layer 138/168 for a fixed magnetic field anneal angle, As shown in FIG. 2C, the angle, a, is the angle between the ABS (or ABS location) and the final magnetic bias of the AFC shield 130/150'/160/170/190. The angle 0 is the angle between the ABS location and the magnetic field for the anneal of step 216 or step 232 of the method 200 or 220, respectively. As can be seen in FIG. 8, the final angle depends upon the thickness of the AFM layer 138, 158, 168, 178 or 198. For all cases, it is assumed that the initial state of the AFC shield bias is perpendicular to the ABS because of the sensor anneal in step 210/212 or 230. For a large enough AFM layer thickness, the anneal results in a single bias angle that is closer to the initial state. For the middle range of thicknesses, which are typically of interest for AFC shields, the final bias angle depends upon the thickness of the AFM layer. This final bias angle is generally between the initial angle (e.g. perpendicular to the ABS) and the angle of the anneal (0). For very small AFM layer thicknesses, the AFM layer 138, 158, 168, 178, or 198 is less stable. Thus, the final bias angle is the same as the angle of the magnetic field during the anneal (.alpha.=.theta.). Similar graphs may be obtained for other magnetic field angles in the anneal and/or other thicknesses of the AFM layers. Thus, as discussed above, the bias angle for the AFC shield(s) of the transducers 110, 110', 110" and 110''' may be set by the angle of the magnetic field during the AFC shield anneal. Further, the bias angle, and thus the magnetic field angle, may be selected based at least in part on the thickness of the AFM layers in the AFC shields.

Figure 9:
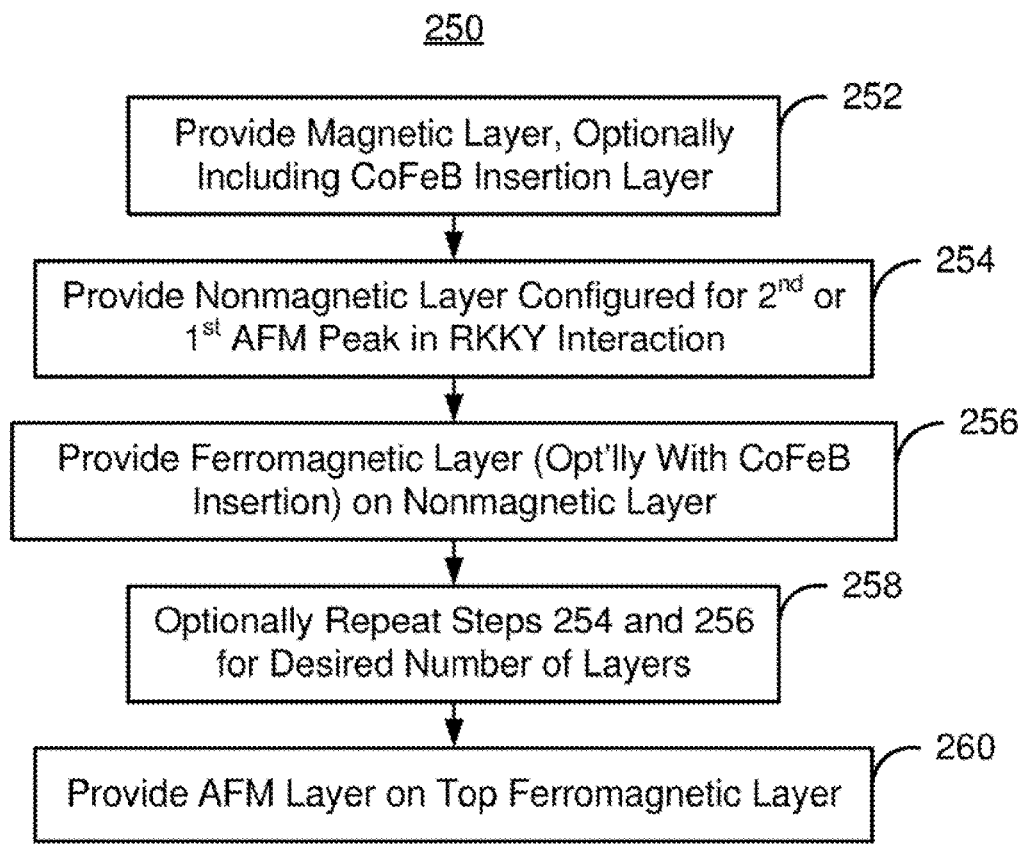
FIG. 9 is a flow chart depicting another exemplary embodiment of a method for fabricating an antiferromagnetically coupled shield in a magnetic recording read transducer including multiple read sensors.

FIG. 9 is an exemplary embodiment of a method 250 for providing an AFC shield in a read transducer having multiple sensors. Some steps may be omitted, interleaved, and/or combined. The method 250 is also described in the context of providing the AFC shield 130 in the single recording transducer 110. However, other AFC shields and/or other magnetic recording transducers 110', 110" and/or 110''' may be manufactured. Further, the method 250 may be used to fabricate multiple shields and multiple transducers at substantially the same time. The method 250 may also be used to fabricate other transducers. The method 250 is also described in the context of particular layers. A particular layer may include multiple materials and/or multiple sub-layers. The method 250 also may start after formation of other portions of the magnetic recording transducer. The method 250 may be incorporated into the method 200, 220 and/or 270 (discussed below).

The ferromagnetic layer 132 is provided, via step 252. In some embodiments, step 252 includes depositing an amorphous magnetic insertion layer within the ferromagnetic layer 132. For example, the CoFeB insertion layer 131 may be provided as part of step 252. The ferromagnetic layer 132 may also include other magnetic layers. For example, a NiFe/CoFeB/NiFe/CoFe layer may be deposited for the magnetic layer 132 in step 252.

The nonmagnetic layer 134 is provided, via step 254. Step 254 may include depositing a nonmagnetic material, such as Ru, to a thickness corresponding to the first or second antiferromagnetic coupling peak in the RKKY interaction. In some embodiments, the second antiferromagnetic coupling peak is selected.

The ferromagnetic layer 136 is provided, via step 256. In some embodiments, step 256 includes depositing an amorphous magnetic insertion layer within the ferromagnetic layer 136. The ferromagnetic layer 136 may also include other magnetic layers. For example, a CoFe/NiFe/CoFe layer may be deposited for the magnetic layer 136 in step 256.

If more than two ferromagnetic layers are desired in the AFC shield, then steps 254 and 256 are optionally repeated a desired number of times. The antiferromagnetic layer 138 is deposited to the desired thickness, via step 260. Using the method 250, the desired configuration of the AFC shield(s) 130, 150', 160, 170 and/or 190 may be achieved. The benefits of the transducer(s) 110, 110', 110", and/or 110''' may be attained.

Figure 10:
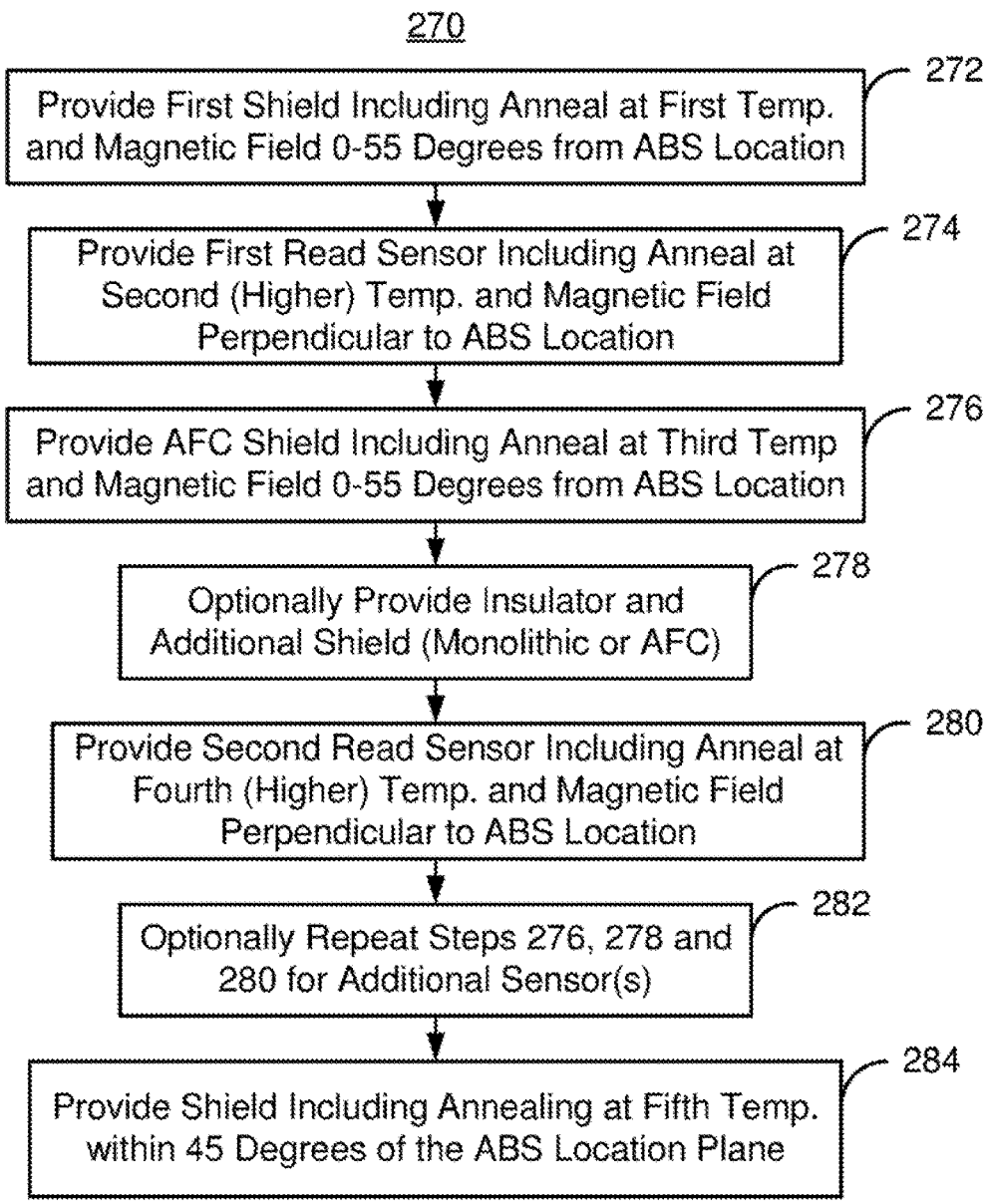
FIG. 10 is a flow chart depicting another exemplary embodiment of a method for fabricating a magnetic recording read transducer including multiple read sensors.

FIG. 10 is an exemplary embodiment of another method 270 for providing a read transducer. Some steps may be omitted, interleaved, and/or combined. FIGS. 11-16 depict wafer 300 level views of an exemplary embodiments of a transducers that may be used in a magnetic disk drive during fabrication using the method 270. The transducers being formed may be considered to be analogous to the transducer 110''', except including a monolithic lower shield 120 in lieu of the AFC lower shield 120'. FIGS. 11-16 are not to scale and not all portions of the transducer 300 are shown. However, the method 250 may be used to fabricate multiple transducers at substantially the same time. The method 250 may also be used to fabricate other disk drives including but not limited to the disk drive 100 and transducers 110/110'/110"/110'''. The method 270 is also described in the context of particular layers. A particular layer may include multiple materials and/or multiple sub-layers. The method 270 also may start after formation of other portions of the magnetic recording transducer.

The first shield 120 is provided, via step 272. Step 222 typically includes depositing (e.g. plating) a large high permeability layer. The layer may also be planarized. In some embodiments, step 272 may optionally include annealing the portion of the transducer 110 that has been fabricated. The anneal is at an elevated temperature and in a magnetic field. The magnetic field is in a direction at least zero degrees and not more than fifty-five degrees from the ABS location. However, in other embodiments, this anneal might be omitted.

The first read sensor 112 is provided, via step 274. Step 274 may be analogous to steps 204 and 224. Thus, step 274 may include depositing the layers for the sensor 112 and annealing the portion of the transducer 110 that has been fabricated (including the sensor 112). The anneal may be used to set the direction of magnetization of portions of read sensor stack and/or for other purposes. The anneal may be in a magnetic field that is in the direction in which the read sensor is desired to be biased, for example perpendicular to the ABS. This anneal may also be at a high temperature compared with the anneal(s) for the shield(s) 120, 130, 150 and/or 160. In some embodiments, the temperature for the anneal of the read sensor 112 is at least 250 degrees Celsius. The temperature may be at least 270 degrees Celsius in some cases. The magnetic bias structures 111 for the read sensor 112 may also be fabricated as part of step 274

Figure 11:
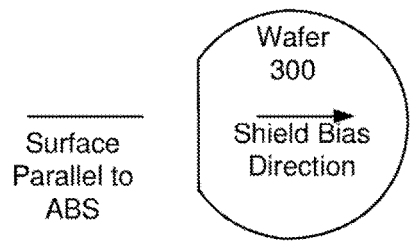
FIGS. 11-16 depict wafer level views of an exemplary embodiment of magnetic field and bias directions for annealing in a magnetic field.
Figure 12:
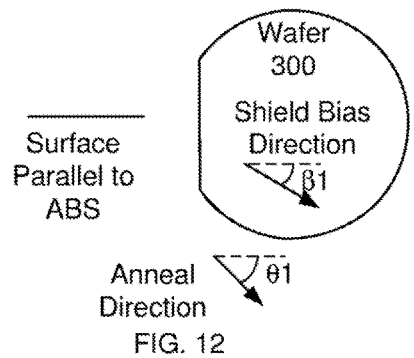

The top middle shield 130 is provided, via step 276. Thus, step 276 includes providing an AFC shield. Step 276 is, therefore, analogous to steps 206 and 226. FIG. 11 depicts the wafer 110 during step 276, after deposition of the layers 132, 134, 136 and 138 for the shield 130. In this case, the shield magnetic bias direction is parallel to the ABS location after deposition. An AFC shield anneal is also performed as part of step 276. Thus, the portion of the transducer 110''' that has been formed is annealed in a magnetic field. FIG. 12 depicts the wafer 300 after the anneal, as well as the direction of the magnetic field during the anneal. The magnetic field is in a direction at an AFC shield anneal angle, .theta.1, from the ABS location. This AFC shield anneal angle .theta.1 is at least zero degrees and not more than fifty-five degrees from the ABS location. In some embodiments, .theta.1 is nominally forty-five degrees from the ABS location. The anneal performed in step 276 is at temperature(s) and magnetic field(s) that are sufficiently high to set the direction of the AFM layer 138 spins and, therefore, the directions of magnetization for the layers 132 and 136. The temperature(s) of the anneal are also sufficiently low that the read sensor 112 is not adversely affected. After the anneal, the bias direction for the AFC shield 130 is at an angle .beta.1 from the ABS location.

An insulating layer 140 and an additional, bottom middle shield 150 are provided, via step 278. In some embodiments, the step 228 of providing the bottom middle shield 150 includes depositing a monolithic shield. An anneal may optionally be performed for the bottom middle shield 150. However, in the embodiment shown, no anneal is performed.

Figure 13:
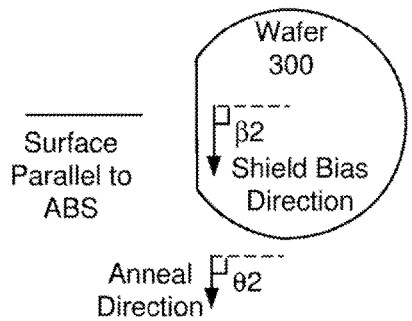

The second read sensor 114 is provided, via step 280. Step 280 may be analogous to steps 210 and 230. The magnetic bias structures 116 for the read sensor 114 may also be fabricated as part of step 280. Step 280 may also include annealing the portion of the transducer that has been fabricated to set the direction of magnetization of portions of read sensor stack and/or for other purposes. For example, the anneal performed in step 280 may be analogous to the anneal for step 274. FIG. 13 depicts the wafer after step 280 is performed. The direction of the magnetic field for the anneal is in the desired sensor bias direction: perpendicular to the Abs. Thus, the magnetic field direction for the anneal, .theta.2, is nominally ninety degrees. Because the sensor anneal is at a higher temperature than the AFC shield anneal, the AFC shield 130 bias direction is changed to match that of the magnetic field used in step 280. Thus, the angle for the shield bias direction after step 280, .beta.2, is nominally ninety degrees.

Figure 14:
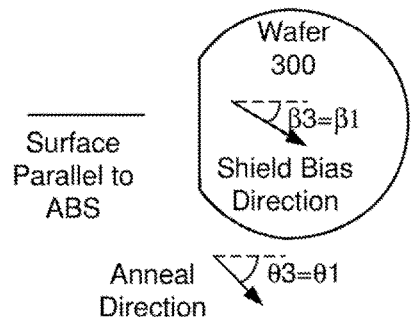
Figure 15:
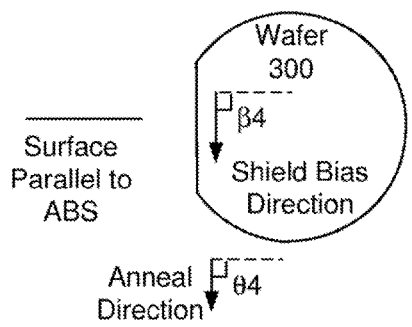

Steps 276, 278 and 280 may optionally be repeated a desired number of times, via step 282. In this embodiment, each step 276, 278 and 280 is repeated once. Thus, an additional AFC shield 170, an additional insulator 180 and a monolithic bottom shield 190' are provided. FIG. 14 depicts the bias for the shields 130 and 170 after the anneal performed when step 276 is repeated. In the embodiment shown, the magnetic field direction is the same for both iterations of step 276. In other words, .theta.3=.theta.1. Consequently, the AFC shield bias direction, .beta.3 is the same as .beta.1 (.beta.3=.beta.1). FIG. 15 depicts the wafer 300 after step 278 has been repeated to form the sensor 118. Because the desired sensor bias direction is perpendicular to plane and the anneal is performed at a higher temperature, the shields 130 and 170 are again biased nominally perpendicular to plane (.theta.4=.beta.4=90 degrees).

Figure 16:
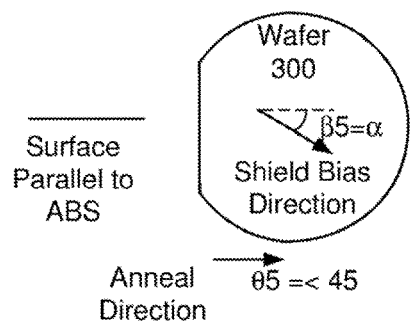

The second (top) shield 160 is provided, via step 284. Thus, step 284 may be performed in an analogous manner to step 276. Step 284 also include performing at least one anneal. Thus, the shields 120, 130, 150, 170, 190 and 160 as well as read sensors 112, 114 and 118 are annealed in a magnetic field in step 284. However, the angle of the magnetic field in step 284 may differ from that in steps 276 and 282. The anneal performed in step 232 is at temperature(s) and magnetic field(s) that are sufficiently high to set the direction of the AFM layers' 138, 178 and 168 moments. The temperature(s) of the anneal are also sufficiently low that the read sensors 112 and 114 are not adversely affected. In this embodiment, the magnetic field direction during the anneal in step 284 is not more than forty-five degrees from the ABS location. In some embodiments, the magnetic field is parallel to the ABS (e.g. in the cross-track direction). FIG. 16 depicts the wafer 300 after step 284. The magnetic field is at an angle of .theta.5. In the embodiment shown in FIG. 6, .theta.5 is zero degrees. The shield bias direction after the anneal, .beta.5, is the desired, final shield bias direction .alpha. This is not more than forty-five degrees from the ABS. In some embodiments, a is nominally thirty-five degrees.

Using the method 270, the desired biasing for the AFC shields 130, 170, and 160 may be achieved. The benefits of the transducers 110, 110', 110" and/or 110''' may thus be realized.

What is claimed is:

1. A magnetic recording device comprising:
a magnetic read transducer comprising:
a first read sensor, a second read sensor, and a third read sensor, wherein the first read sensor, the second read sensor, and the third read sensor are positioned in a down track direction with the second read sensor between the first read sensor and the third read sensor, and wherein the first read sensor, the second read sensor, and the third read sensor are offset from one another in a cross track direction, the down track direction being in a plane that is parallel to an air bearing surface of the magnetic read transducer and the cross track direction being in a plane that is perpendicular to the air bearing surface;
a first middle shield between the first read sensor and the second read sensor, wherein the first middle shield comprises a first top middle shield and a first bottom middle shield separated by a first insulator; and
a second middle shield between the second read sensor and the third read sensor, wherein the second middle shield comprises a second top middle shield and a second bottom middle shield separated by a second insulator,
wherein the first top middle shield comprises a first antiferromagnetic layer and the first bottom middle shield comprises a second antiferromagnetic layer; and
wherein the first antiferromagnetic layer is separated from the second antiferromagnetic layer by the first insulator; and
wherein the first top middle shield further comprises a first plurality of layers between the first antiferromagnetic layer and the first read sensor and the first bottom middle shield further comprises a second plurality of layers between the second antiferromagnetic layer and the second read sensor.

2. The magnetic recording device of claim 1, wherein the magnetic read transducer is fabricated on a slider of the magnetic recording device.

3. The magnetic recording device of claim 1, further comprising a bottom shield adjacent to the first read sensor, wherein the first read sensor is between the bottom shield and the first middle shield.

4. The magnetic recording device of claim 1, further comprising a top shield adjacent to the third read sensor, wherein the third read sensor is between the top shield and the second middle shield, and wherein the top shield comprises a first magnetic layer, a second magnetic layer, a nonmagnetic layer separating the first magnetic layer and the second magnetic layer, and a third antiferromagnetic layer separated from the third read sensor by the first magnetic layer, the second magnetic layer, and the nonmagnetic layer.

5. The magnetic recording device of claim 1, wherein the first plurality of layers of the first top middle shield comprises a first magnetic layer and a second magnetic layer separated by a nonmagnetic layer.

6. The magnetic recording device of claim 5, wherein the first bottom middle shield is an antiferromagnetic shield, and wherein the second plurality of layers comprises a third magnetic layer and a fourth magnetic layer separated by an additional nonmagnetic layer.

7. The magnetic recording device of claim 1, wherein the second top middle shield comprises a first magnetic layer and a second magnetic layer separated by a nonmagnetic layer, and a third antiferromagnetic layer separated from the second read sensor by the first magnetic layer, the second magnetic layer, and the nonmagnetic layer.

8. The magnetic recording device of claim 1, wherein the second bottom middle shield is a monolithic shield.

9. The magnetic recording device of claim 1, wherein the second bottom middle shield is an antiferromagnetic shield comprising a first magnetic layer and a second magnetic layer separated by a nonmagnetic layer, and an antiferromagnetic layer separated from the third read sensor by the first magnetic layer, the second magnetic layer, and the nonmagnetic layer.

10. The magnetic recording device of claim 1, wherein the first middle shield is configured to be magnetically biased at an angle of least zero degrees and not more than fifty-five degrees from the air bearing surface.

11. The magnetic recording device of claim 1, wherein each of the first read sensor, the second read sensor, and the third sensor are flanked on either side in the cross track direction by a magnetic bias structure.

12. A magnetic read transducer comprising:
a first read sensor;
a second read sensor positioned in a down track direction from the first read sensor and offset from the first read sensor in a cross track direction, wherein the down track direction is in a plane that is parallel to an air bearing surface of the magnetic read transducer and the cross track direction is in a plane that is perpendicular to the air bearing surface;
a top middle shield comprising a first magnetic layer, a second magnetic layer, a nonmagnetic layer separating the first magnetic layer and the second magnetic layer, and an antiferromagnetic layer, wherein the first magnetic layer is between the first read sensor and the nonmagnetic layer and the antiferromagnetic layer is between the second magnetic layer and the second read sensor;
a bottom middle shield between the antiferromagnetic layer and the second read sensor, the bottom middle shield comprising a first additional magnetic layer and an additional antiferromagnetic layer; and
an insulator layer between the top middle shield and the bottom middle shield,
wherein the antiferromagnetic layer is between the insulator layer and the second magnetic layer, and
wherein the additional antiferromagnetic layer is between the insulator layer and the first additional magnetic layer.

13. The magnetic read transducer of claim 12, wherein the first magnetic layer comprises NiFe layers separated by a CoFeB insertion layer.

14. The magnetic read transducer of claim 12, wherein the antiferromagnetic layer has a thickness of no more than one hundred and sixty Angstroms.

15. The magnetic read transducer of claim 12, wherein the bottom middle shield further comprises a second additional magnetic layer and an additional nonmagnetic layer separating the first additional magnetic layer and the second additional magnetic layer.

16. A magnetic read transducer comprising:
a first read sensor;
a second read sensor positioned in a down track direction from the first read sensor and offset from the first read sensor in a cross track direction, wherein the down track direction is in a plane that is parallel to an air bearing surface of the magnetic read transducer and the cross track direction is in a plane that is perpendicular to the air bearing surface;
a top middle shield comprising a first magnetic layer, a second magnetic layer, a nonmagnetic layer separating the first magnetic layer and the second magnetic layer, and an antiferromagnetic layer, wherein the first magnetic layer is between the first read sensor and the nonmagnetic layer and the antiferromagnetic layer is between the second magnetic layer and the second read sensor;
a bottom middle shield between the antiferromagnetic layer and the second read sensor the bottom middle shield comprising a first additional magnetic layer and an additional antiferromagnetic layer;

an insulator layer between the top middle shield and the bottom middle shield, wherein the additional antiferromagnetic layer is between the insulator layer and the first additional magnetic layer, and wherein the antiferromagnetic layer is between the insulator layer and the second magnetic layer; and a top shield adjacent to the second read sensor in the down track direction, wherein the second read sensor is between the top shield and the first read sensor and the top shield comprises top shield magnetic layers separated by a top shield nonmagnetic layer, and a top shield antiferromagnetic layer, wherein the top shield nonmagnetic layer is between the top shield antiferromagnetic layer and the second read sensor.

17. The magnetic read transducer of claim 16, wherein the top middle shield, the bottom middle shield, and the top shield are configured to be magnetically biased at an angle of least zero degrees and not more than fifty-five degrees from the air bearing surface.

18. The magnetic read transducer of claim 16, wherein the bottom middle shield is an antiferromagnetic shield further comprising a second additional magnetic layer and an additional nonmagnetic layer separating the first additional magnetic layer and the second additional magnetic layer.

* * * * *